(12) United States Patent
Jiang et al.

(10) Patent No.: US 12,114,352 B2
(45) Date of Patent: Oct. 8, 2024

(54) CONTENTION WINDOW ADJUSTMENT METHOD AND APPARATUS AND COMMUNICATION SYSTEM

(71) Applicant: FUJITSU LIMITED, Kawasaki (JP)

(72) Inventors: Qinyan Jiang, Beijing (CN); Lei Zhang, Beijing (CN); Guoyu Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 738 days.

(21) Appl. No.: 17/144,732

(22) Filed: Jan. 8, 2021

(65) Prior Publication Data

US 2021/0127422 A1     Apr. 29, 2021

Related U.S. Application Data

(63) Continuation of application No. PCT/CN2018/100061, filed on Aug. 10, 2018.

(51) Int. Cl.
*H04W 4/00* (2018.01)
*H04L 1/1812* (2023.01)
(Continued)

(52) U.S. Cl.
CPC ....... *H04W 74/0808* (2013.01); *H04L 1/1819* (2013.01); *H04L 5/0055* (2013.01); *H04W 72/0453* (2013.01); *H04W 74/008* (2013.01)

(58) Field of Classification Search
CPC ......... H04W 74/0808; H04W 72/0453; H04W 74/008; H04L 1/1819; H04L 5/0055;
(Continued)

(56) References Cited

U.S. PATENT DOCUMENTS

2017/0019909 A1   1/2017   Si et al.
2017/0215172 A1*  7/2017   Yang .................. H04L 27/2601
(Continued)

FOREIGN PATENT DOCUMENTS

CN   107624265 A    1/2018
EP   3 737 017 A1   11/2020
(Continued)

OTHER PUBLICATIONS

Extended European search report with supplementary European search report and the European search opinion issued by the European Patent Office for corresponding European Patent Application No. 18929044.8-1215, dated Aug. 6, 2021.
(Continued)

*Primary Examiner* — Chuong T Ho
(74) *Attorney, Agent, or Firm* — Myers Wolin, LLC

(57) ABSTRACT

A contention window adjustment method and apparatus and a communication system. The method includes: transmitting first data by a transmitting device on a carrier, the carrier including two or more bandwidth units; and adjusting a contention window (CW) associated with a bandwidth unit to which the first data correspond by the transmitting device. Certain embodiments herein provide, in a case where data (referred to as first data) are transmitted on a carrier including two or more bandwidth units (such as a BWP/LBT sub-band/LBT channel), by adjusting the CW associated with the bandwidth unit to which the data correspond, a problem that the existing CW adjustment method is inapplicable to a scenario where a carrier corresponds to two or more bandwidth units may be solved.

20 Claims, 6 Drawing Sheets

(51) Int. Cl.
  *H04L 5/00* (2006.01)
  *H04W 72/0453* (2023.01)
  *H04W 74/00* (2009.01)
  *H04W 74/0808* (2024.01)

(58) Field of Classification Search
  CPC ... H04L 5/0053; H04L 1/1614; H04L 1/1829; H04L 1/187
  USPC .......................................... 370/329, 330, 328
  See application file for complete search history.

(56) References Cited

U.S. PATENT DOCUMENTS

| | | | |
|---|---|---|---|
| 2018/0124828 A1 | 5/2018 | Kim et al. | |
| 2019/0036831 A1* | 1/2019 | Li | H04W 72/23 |
| 2019/0037601 A1* | 1/2019 | Noh | H04L 1/1887 |
| 2019/0246412 A1* | 8/2019 | Noh | H04W 72/0446 |
| 2020/0053777 A1* | 2/2020 | Babaei | H04L 1/1812 |
| 2020/0259599 A1* | 8/2020 | Zhang | H04L 1/1864 |
| 2020/0344819 A1* | 10/2020 | Myung | H04W 74/0841 |
| 2020/0374236 A1 | 11/2020 | Li et al. | |
| 2022/0183036 A1* | 6/2022 | Noh | H04W 72/1268 |

FOREIGN PATENT DOCUMENTS

| | | |
|---|---|---|
| JP | 2021-513308 A | 5/2021 |
| WO | 2019/158021 A1 | 8/2019 |

OTHER PUBLICATIONS

Ericsson et al., "LS on L1 parameters for LAA", R1-157622, List of Agreements on LAA from RAN1#83, agreed in R1-157705, downloaded by EPO on Feb. 14, 2016.

Notice of Reasons for Refusal issued by the Japan Patent Office issued for corresponding Japanese Patent Application No. 2021-500599, mailed on Mar. 8, 2022, with an English translation.

International Search Report and Written Opinion of the International Searching Authority issued by National Intellectual Property Administration of P.R. China for the PCT application No. PCT/CN2018/100061 on Apr. 28, 2019, with English translation.

LG Electronics, "Channel access procedure for NR unlicensed operation", Agenda item: 7.6.4.1, 3GPP TSG RAN WG1 Meeting #93, R1-1806645, May 21-25, 2018, Busan, Korea.

Huawei et al.,"Coexistence and channel access for NR unlicensed band operations", Agenda item: 7.6.4, 3GPP TSG RAN WG1 Meeting #92bis, R1-1803679, Apr. 16-20, 2018, Sanya, China.

Vivo, "Discussion on the channel access procedures", Agenda item: 7.6.4, 3GPP TSG RAN WG1 Meeting #92bis, R1-1803857, Apr. 16-20, 2018, Sanya, China.

First Notification of Office Action and Search Report issued by the China National Intellectual Property Administration for corresponding Chinese Patent Application No. 201880094971.3, dated Jun. 1, 2023, with an English translation.

Communication pursuant to Article 94(3) EPC issued by the European Patent Office for corresponding European Patent Application No. 18 929 044.8-1215, mailed on Sep. 4, 2023.

Fujitsu, "On channel access procedure for NR-U", Agenda Item: 7.2.2.4.1, 3GPP TSG-RAN WG1 Meeting #94bis, R1-1810588, Chengdu, China, Oct. 8-12, 2018.

Second Notification of Office Action issued by the China National Intellectual Property Administration for corresponding Chinese Patent Application No. 201880094971.3, mailed on Jan. 25, 2024, with an English translation.

Decision of Rejection issued by the China National Intellectual Property Administration for corresponding Chinese Patent Application No. 201880094971.3, mailed on May 1, 2024, with an English translation.

* cited by examiner

FIG. 6
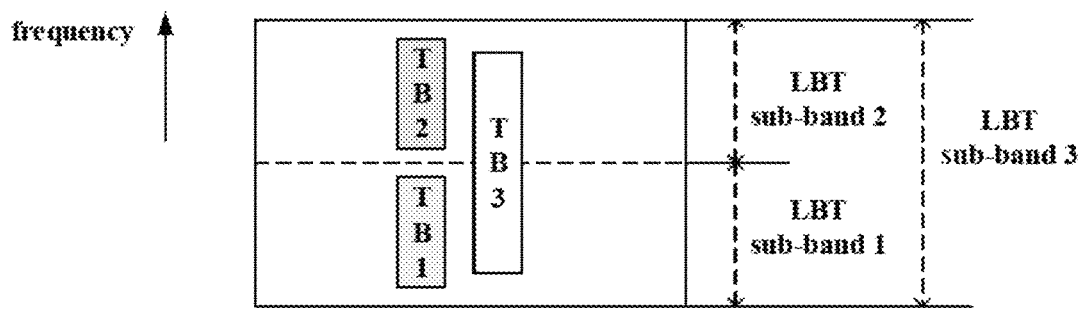
FIG. 7
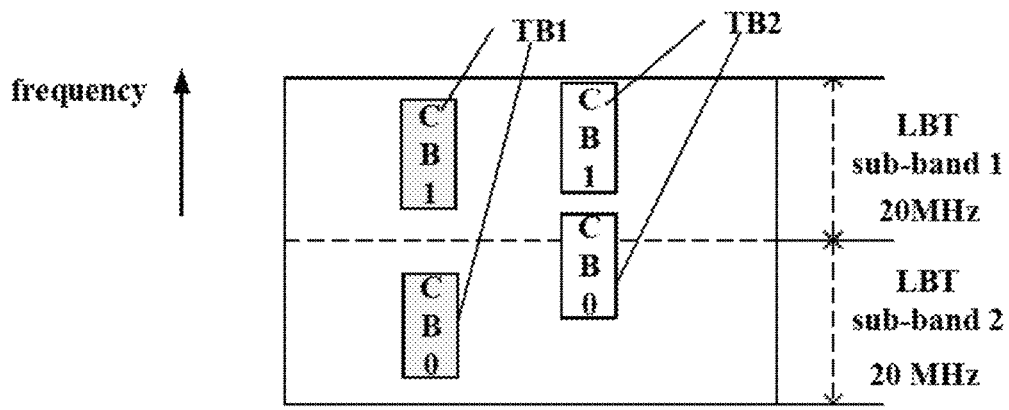
FIG. 8
801
a receiving device transmits first information to a transmitting device, the first information being used for indicating two or more bandwidth units of a carrier, the transmitting device transmitting first data on the carrier and adjusting a contention window (CW) associated with a bandwidth unit to which the first data correspond

FIG. 9

901 a receiving device transmits association information of first data to a transmitting device, so that the transmitting device determines reception situation of the first data or reception of a part of data of the first data according to the association information of the first data, and adjusts a contention window associated with a bandwidth unit to which the part of data correspond according to the reception situation of the first data or according to the reception situation of the part of data of the first data

FIG. 10

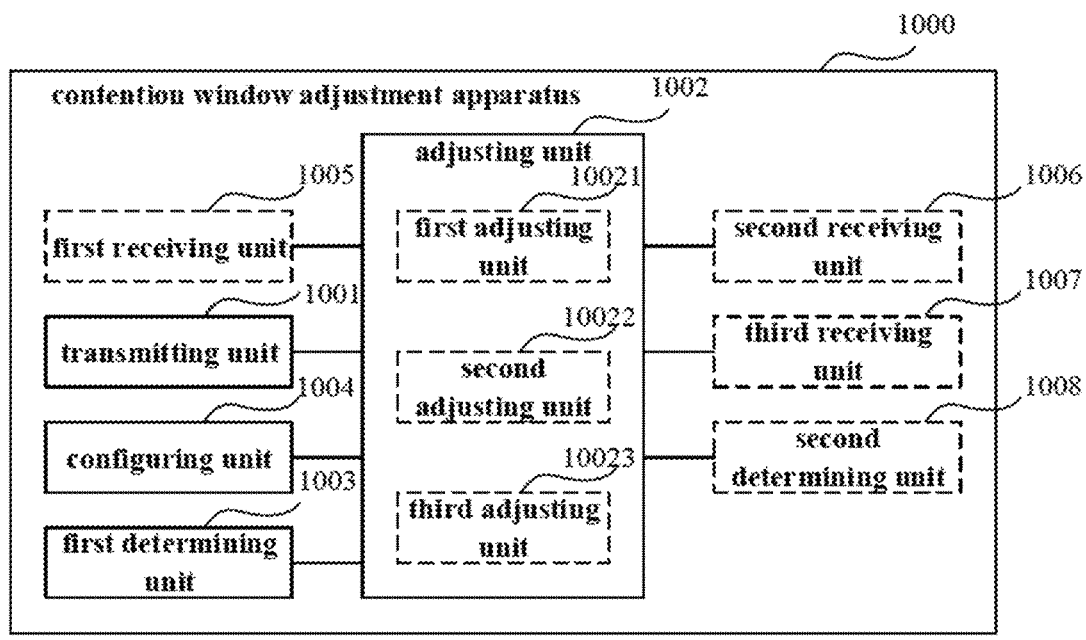

CONTENTION WINDOW ADJUSTMENT METHOD AND APPARATUS AND COMMUNICATION SYSTEM

CROSS-REFERENCE TO RELATED APPLICATION

This application is a continuation application of International Application PCT/CN2018/100061 filed on Aug. 10, 2018 and designated the U.S., the entire contents of which are incorporated herein by reference.

FIELD

This disclosure relates to the field of communication technologies, and in particular to a contention window adjustment method and apparatus and a communication system.

BACKGROUND

Listen Before Talk (LBT) is a channel access mechanism that enables wireless LANs to effectively share the same spectrum resources. Because the availability of channels on unlicensed frequency bands cannot be guaranteed all the times, LBT requires devices to monitor the channels before transmitting data, perform idle channel assessment, and transmit data when the channels are guaranteed to be idle.

LBT with random back-off with variable size of contention window is adopted in license assisted access (LAA) in long term evolution (LTE). That is, a channel access procedure of a transmitting device includes random back-off, and a contention window (CW) to which the random back-off corresponds may be adjusted. In the random back-off, the transmitting device respectively evaluates whether the channels are idle by detecting channel energies in each time interval according to a random back-off counter. If the channels are idle in a time interval, the value of the counter is subtracted by 1, and until the value of the counter is 0, the transmitting device considers that the channels are idle and starts to transmit data on the channels.

In the above mechanism, an initial value of the random backoff counter may be an integer between 0-CWS/CWV; where, CWS is a contention window size, CWV is a contention window value, and "l" is "or", and for the convenience of description, it is referred to as a contention window (CW). Therefore, before initializing the random backoff counter, adjusting the contention window size may control an average time needed by the transmitting device in accessing to channels.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in LAA, one carrier corresponds to one channel. That is, a transmitting device determines according to the above channel access procedure whether a carrier is able to be used to transmit data, a channel bandwidth to which the channel access corresponds is identical to a bandwidth of data mapping, and reception situation of data transmitted on the carrier reflects a channel state of a channel to which the carrier corresponds. Hence, according to feedback information corresponding to a carrier, the transmitting device may determine reception situation of data previously transmitted on the carrier, and adjust a CW with which the carrier is associated. For example, if the transmitting device determines that a rate of success of reception of the data transmitted by it is higher than a threshold, it sets the CW to be of a minimum value in a predefined CW set; otherwise, it increases the CW to be of a next relatively large value in the CW set.

However, in New Radio (NR), one carrier may correspond to two or more channels, and a transmitting device may determine whether each channel may be used to transmit data respectively according to a channel access procedure, and the bandwidth of data mapping may span two or more channels. Therefore, a channel bandwidth to which channel access corresponds and a channel bandwidth of the data mapping may not match. If the transmitting device still determines a CW adjustment policy by using the above method, that is, adjust the CW associated with a carrier according to the feedback information corresponding the carrier, an obtained CW adjustment policy may not be applicable to two or more channels on the carrier.

In order to solve at least one of the above problems, embodiments of this disclosure provide a contention window adjustment method and apparatus and a communication system.

According to a first aspect of the embodiments of this disclosure, there is provided a contention window adjustment method, including:
  transmitting first data by a transmitting device on a carrier, the carrier including two or more bandwidth units; and
  adjusting, by the transmitting device, a contention window (CW) associated with a bandwidth unit to which the first data correspond.

According to a second aspect of the embodiments of this disclosure, there is provided a contention window adjustment apparatus, including:
  a transmitting unit configured to transmit first data on a carrier, the carrier including two or more bandwidth units; and
  an adjusting unit configured to adjust a contention window (CW) associated with a bandwidth unit to which the first data correspond.

According to a third aspect of the embodiments of this disclosure, there is provided a data transmission method, including:
  transmitting first information by a receiving device to a transmitting device, the first information being used for indicating two or more bandwidth units of a carrier, the transmitting device transmitting first data on the carrier and adjusting a contention window (CW) associated with a bandwidth unit to which the first data correspond.

According to a fourth aspect of the embodiments of this disclosure, there is provided a data transmission apparatus, including:
  a transmitting unit configured to transmit first information to a transmitting device, the first information being used for indicating two or more bandwidth units of a carrier, the transmitting device transmitting first data on the carrier and adjusting a contention window (CW) associated with a bandwidth unit to which the first data correspond.

According to a fifth aspect of the embodiments of this disclosure, there is provided a network device, including the apparatus described in the second or fourth aspect.

According to a sixth aspect of the embodiments of this disclosure, there is provided a terminal equipment, including the apparatus described in the second aspect.

According to a seventh aspect of the embodiments of this disclosure, there is provided a communication system, including a network device and a terminal equipment, the network device including the apparatus described in the second or fourth aspect, and terminal equipment including the apparatus described in the second aspect.

According to another aspect of the embodiments of this disclosure, there is provided a computer readable program, which, when executed in a network device, will cause a computer to carry out the method described in the first or third aspect in the network device.

According to a further aspect of the embodiments of this disclosure, there is provided a computer storage medium, including a computer readable program, which will cause a computer to carry out the method described in the first or third aspect in a network device.

According to yet another aspect of the embodiments of this disclosure, there is provided a computer readable program, which, when executed in a terminal equipment, will cause a computer to carry out the method described in the first aspect in the terminal equipment.

According to a further aspect of the embodiments of this disclosure, there is provided a computer storage medium, including a computer readable program, which will cause a computer to carry out the method described in the first aspect in a terminal equipment.

An advantage of the embodiments of this disclosure exists in that in a case where data (referred to as first data) are transmitted on a carrier including two or more bandwidth units (such as a LBT sub-band/LBT channel), by adjusting the CW associated with the bandwidth unit to which the data correspond, a problem that the existing CW adjustment method is inapplicable to a scenario where a carrier corresponds to two or more bandwidth units may be solved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 6 is a further schematic diagram of division of a bandwidth unit of a carrier bandwidth;

FIG. 7 is still another schematic diagram of division of a bandwidth unit of a carrier bandwidth;

FIG. 8 is a schematic diagram of an implementation of the data transmission method of Embodiment 2;

FIG. 9 is a schematic diagram of another implementation of the data transmission method of Embodiment 2;

FIG. 10 is a schematic diagram of the contention window adjustment apparatus of Embodiment 3;

DETAILED DESCRIPTION

Figure 1:
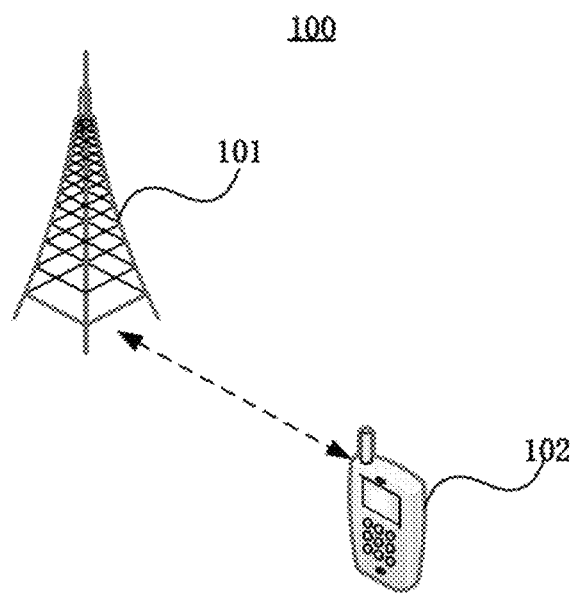
FIG. 1 is a schematic diagram of a communication system.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, a communication system 100 may include a network device 101 and a terminal equipment 102. For the sake of simplicity, description is given in FIG. 1 by taking one terminal equipment as an example. And the network device 101 is, for example, a network device gNB of NR.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

The terminal equipment 102 may transmit data to the network device 101, for example, in a grant-free transmission mode. The network device 101 may receive data transmitted by one or more terminal equipments 102, and feed back information (such as acknowledgement ACK/non-acknowledgement NACK) to the terminal equipment 102, and the terminal equipment 102 may acknowledge terminating a transmission process according to the feedback information, or may further perform new data transmission, or may perform data retransmission.

Implementations of the embodiments of this disclosure shall be described below with reference to the accompanying drawings. These implementations are illustrative only, and are not intended to limit this disclosure.

Embodiment 1

Figure 2:
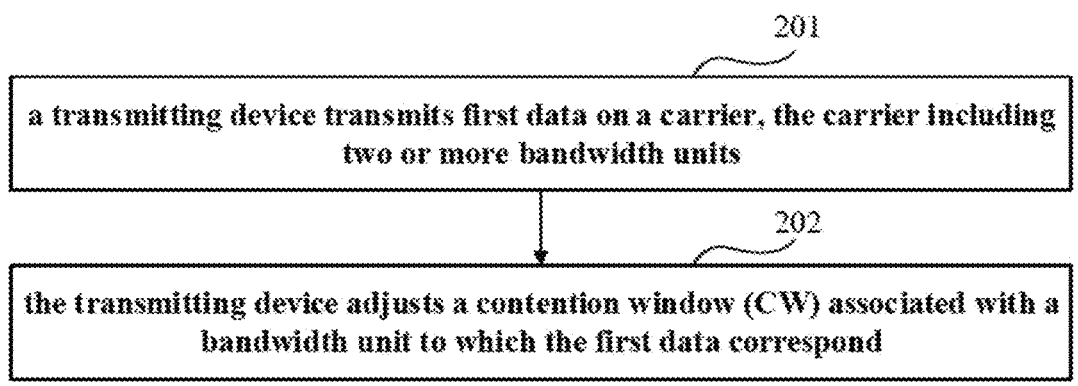
FIG. 2 is a schematic diagram of the contention window adjustment method of Embodiment 1.

The embodiment of this disclosure provides a contention window adjustment method, applicable to a transmitting device, such as the network device 101 or the terminal equipment 102 of the communication system shown in FIG. 1. FIG. 2 is a schematic diagram of the contention window adjustment method of this embodiment. Referring to FIG. 2, the method includes:

step 201: a transmitting device transmits first data on a carrier, the carrier including two or more bandwidth units; and step 202: the transmitting device adjusts a contention window (CW) associated with a bandwidth unit to which the first data correspond.

In this embodiment, in a case where data (referred to as first data) are transmitted on a carrier including two or more bandwidth units (such as a BWP/LBT sub-band/LBT channel), by adjusting the CW associated with the bandwidth unit to which the data correspond, a problem that the existing CW adjustment method is inapplicable to a scenario where a carrier corresponds to two or more bandwidth units may be solved.

In step 201 of this embodiment, the transmitting device may be a network device or a terminal equipment, which may transmit the first data via a channel access procedure, and adjust the CW according to association information of the first data. Here, the association information of the first data may be received from a receiving device, or may be determined according to a predetermined criterion in a case where the association information of the first data is not received, and details thereof shall be described later.

Figure 3:
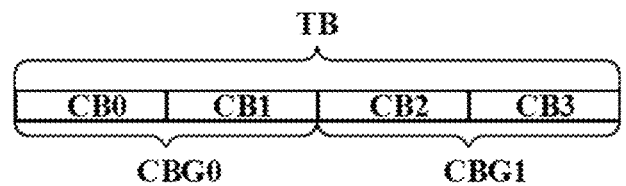
FIG. 3 is a schematic diagram of a transport block.

In step 201 of this embodiment, the first data may include at least one transport block (TB), each TB including one or more code blocks (CBs). The one or more CBs may be grouped into one or more code block groups (CBGs), that is, a CBG may include one or more CBs. In this embodiment, if the transmitting device is a network device, the first data may be transmitted via a physical downlink shared channel (PDSCH), and if the transmitting device is a terminal equipment, the first data may be transmitted via a physical uplink shared channel (PUSCH). FIG. 3 is an example of a TB. In this example, one TB includes four CBs, and every two CBs are grouped into one CBG. The example in FIG. 3 is illustrative only, which does not represent an actual TB composition.

The first data including one TB shall be described below. In a case where the first data includes more than one TBs, a case of each TB is identical to the case of one TB.

In step 201 of this embodiment, a carrier may include two or more bandwidth units, and the bandwidth units here may be downlink or uplink bandwidth parts (DL/UL BWPs), or LBT channels, or may also be LBT sub-bands. The transmitting device may determine whether a channel to which a bandwidth unit corresponds is idle by detecting energy and/or a signal on the bandwidth unit. And bandwidth sizes and/or frequency domain starting positions of at least two of the two or more bandwidth units may be different.

Figure 4:
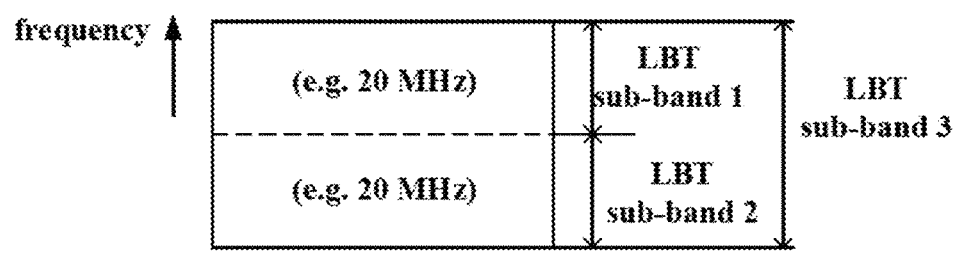
FIG. 4 is a schematic diagram of division of a bandwidth unit of a carrier bandwidth.
Figure 5:
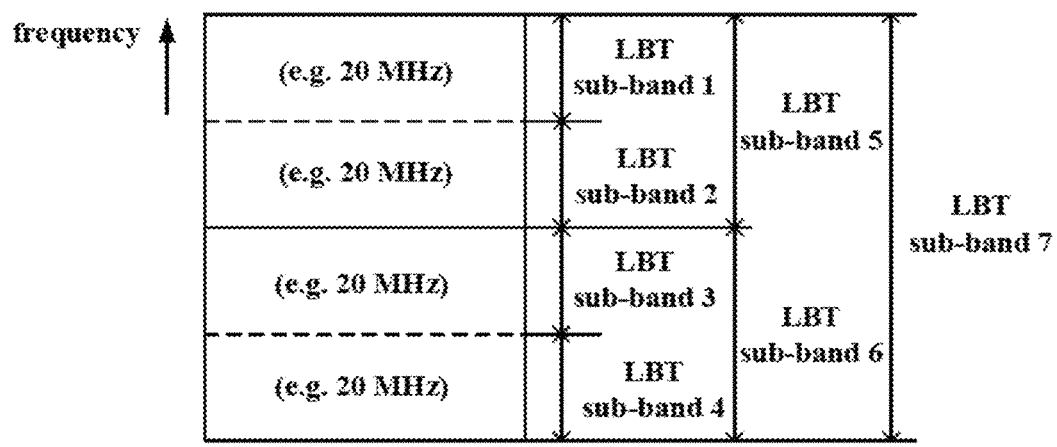
FIG. 5 is another schematic diagram of division of a bandwidth unit of a carrier bandwidth.

In an implementation, if the transmitting device is a network device, the above carrier is a downlink carrier, and the two or more bandwidth units included in the carrier are bandwidth units of the downlink carrier, such as downlink carrier sub-bands (DL BWPs), LBT channels or LBT sub-bands. In this implementation, the network device may pre-configure the bandwidth units included in the carrier. For example, the network device may pre-configure bandwidth units of the downlink carrier according to a standard or a protocol or a regulatory requirement of an unlicensed frequency band. FIGS. 4 and 5 take that the bandwidth units are LBT sub-bands as examples. If the bandwidth units are BWPs or LBT channels, they similar to the LBT sub-bands.

In an example, assuming that a carrier bandwidth (CBW) of a carrier is of 40 MHz, and bandwidth units thereof are divided as shown in FIG. 4, the LBT sub-bands on the carrier may be two or more of LBT sub-bands 1-3, such as LBT sub-band 1 and LBT sub-band 2, or LBT sub-band 1 and LBT sub-band 3, or LBT sub-bands 1-3.

In another example, assuming that a carrier bandwidth (CBW) of a carrier is of 80 MHz, and bandwidth units thereof are divided as shown in FIG. 5, the LBT sub-bands on the carrier may be two or more of LBT sub-bands 1-7, such as LBT sub-bands 1-4, or LBT sub-bands 5-6, or LBT sub-bands 1-3 and LBT sub-band 6, or LBT sub-bands 1-7.

In this implementation, the frequency domain bandwidth to which the two or more bandwidth units correspond is equal to the carrier bandwidth.

In another implementation, if the transmitting device is a terminal equipment, the carrier is an uplink carrier, and the two or more bandwidth units included in the carrier are bandwidth units of the uplink carrier, such as uplink carrier subbands (UL BWPs), LBT channels or LBT sub-bands. In this implementation, the network device may explicitly or implicitly indicate configuration of the bandwidth units included in the carrier, and the terminal equipment may receive information (referred to as the first information) indicating the two or more bandwidth units included in the carrier transmitted by the network device, so as to determine the configuration of the bandwidth units included in the carrier.

For example, if the bandwidth units are UL BWPs, the network device informs the terminal equipment of one or more uplink carrier subbands (UL BWPs) of the uplink carrier, such as a frequency domain starting point, and a bandwidth, etc., via a system message or radio resource control (RRC) signaling.

For another example, if the bandwidth units are LBT sub-bands or LBT channels and the network device informs the terminal equipment of one or more uplink carrier sub-bands (UL BWPs) of the uplink carrier via a system message or radio resource control (RRC) signaling, such as a frequency domain starting point, and a bandwidth, etc., and the terminal equipment may determine the LBT sub-bands or LBT channels to which the uplink carrier sub-band corresponds according to a frequency domain position of the uplink carrier sub-band and a predefined rule. For another example, the network device may directly explicitly transmit indication information to indicate the LBT sub-bands or LBT channels to which the uplink carrier sub-band corresponds.

In step 202 of this embodiment, the number of the bandwidth units to which the first data correspond is at least one, and the bandwidth units to which the first data correspond may be determined by the transmitting device according to frequency domain resources used for transmitting the first data.

In an implementation, if all of the frequency domain resources used for transmitting the first data are within a bandwidth range of a bandwidth unit, the bandwidth unit is deemed as the bandwidth unit to which the first data correspond. That is, all of the frequency domain resources used for transmitting the first data are within the bandwidth range of the bandwidth unit to which the first data correspond.

FIG. 6 is a schematic diagram of division of bandwidth units. As shown in FIG. 6, all of the frequency domain resources used for transmitting TB1 are in LBT sub-band 1 and LBT sub-band 3, and TB1 may correspond to LBT sub-band 1 and/or LBT sub-band 3; likewise, all of the frequency domain resources used for transmitting TB2 are in LBT sub-band 2 and LBT sub-band 3, hence, TB2 may correspond to LBT sub-band 2 and/or LBT sub-band 3; likewise, all of the frequency domain resources used for transmitting TB3 are in LBT sub-band 3, hence, TB3 may correspond to LBT sub-band 3.

In this implementation, whether the first data correspond to one bandwidth unit or multiple bandwidth units is in dependence on configuration of bandwidth units included in a carrier, and the configuration of the bandwidth units is as described above and shall not be described herein any further. For example, if the configuration of the bandwidth units included in the carrier is LBT sub-band 1 and LBT sub-band 2, TB1 may correspond to LBT sub-band 1; and if the configuration is LBT sub-bands 1-3, TB1 may correspond to LBT sub-band 1 and LBT sub-band 3.

In this implementation, in particular, the first data may have no corresponding bandwidth unit. For example, if the configuration of the bandwidth units included in the carrier is LBT sub-band 1 and LBT sub-band 2, TB3 is unable to correspond to any LBT sub-band.

In another implementation, if at least a part of the frequency domain resources used for transmitting the first data are within a bandwidth range of a bandwidth unit, the bandwidth unit is deemed as being the bandwidth unit to which the first data correspond. That is, as long as a part of the frequency domain resources used for transmitting the first data are located in a bandwidth range of a bandwidth unit, it is deemed that the first data correspond to the bandwidth unit.

Still taking FIG. 6 as an example, according to this implementation, TB1 may correspond to LBT sub-band 1 and/or LBT sub-band 3, TB2 may correspond to LBT sub-band 2 and/or LBT sub-band 3, and TB3 may correspond to LBT sub-band 1 and/or LBT sub-band 2 and/or LBT sub-band 3.

In this implementation, likewise, whether the first data correspond to one bandwidth unit or multiple bandwidth units is in dependence on configuration of bandwidth units included in a carrier. Details are as described in the previous implementation, which shall not be described herein any further.

In step 202 of this embodiment, in addition to determining the bandwidth unit to which the first data correspond according to the frequency domain resources used for transmitting the first data, the bandwidth unit to which the first data correspond may also be determined according to at least one of the following information:

- an access priority of a channel used for transmitting the first data;
- an interval of subcarriers used for transmitting the first data;
- a position of a time-domain resource used for transmitting the first data;
- a hybrid automatic repeat request (HARQ) process to which the first data correspond; and
- a position of a time-frequency resource used for transmitting association information of the first data.

In this embodiment, there may exist a correspondence between the access priority of a channel, the interval of subcarriers, the position of the time-domain resource of the first data, the HARQ process, the position of a time-frequency resource of association information of the first data and the bandwidth unit. Therefore, the transmitting device may determine the bandwidth unit to which the first data correspond according to the above information and the correspondence. For example, there exists a correspondence between the access priority of a channel and the bandwidth unit. Taking FIG. 6 as an example, when access priority 1 of a channel corresponds to LBT sub-band 1 and access priority 2 of a channel corresponds to LBT sub-band 2, if TB1 is transmitted by using access priority 1 of a channel, TB1 may correspond to LBT sub-band 1, and if TB1 is transmitted by using access priority 2 of a channel, TB1 may correspond to LBT sub-band 2.

In this embodiment, a mode according to which the bandwidth unit to which the first data correspond is determined may be predefined or preconfigured, such as predefining according to frequency bands, that is, different frequency bands adopt different modes; however, this embodiment is not limited thereto. In addition, in this embodiment, if the transmitting device is a terminal equipment, the bandwidth unit to which the first data correspond may also be indicated by the network device. For example, the transmitting device may receive information (referred to as second information) for indicating the bandwidth unit to which the first data correspond transmitted by the network device, thereby determining the bandwidth unit to which the first data correspond.

In step 202 of this embodiment, as to the CW associated with the bandwidth unit to which the first data correspond, in one implementation, a group of CWs is associated with a bandwidth unit, each CW in the group of CWs being used for an access priority of a channel (value ranges of candidate sets of CWs to which different access priorities of channels correspond are different). In this implementation, an initial value of the random backoff counter used in the channel access procedure of the bandwidth unit to which the first data correspond is generate according to the CW with which the bandwidth unit is associated to. In another implementation, a group of CWs is associated with two or more bandwidth units, each CW in this group of CWs being used for an access priority of a channel. In this implementation, the initial value of the random backoff counter used in the channel access procedure of the bandwidth unit to which the first data correspond is generated according to the CW associated with the bandwidth unit, or the initial value of the random backoff counter used in a channel access procedure of a bandwidth unit in the bandwidth units to which the first data correspond is generated according to a CW associated with the bandwidth unit, and other bandwidth units associated with the same CW as the bandwidth unit quickly access to the channel under a condition that the channel access of the bandwidth unit is successful.

In step 202 of this embodiment, the transmitting device may adjust the contention window associated with the bandwidth unit to which a part of data of the first data correspond according to reception situation of the part of data, and may also adjust the contention window associated with the bandwidth unit to which a part of data of the first data correspond according to reception situation of the first data.

In this embodiment, the reception situation of the first data or the reception situation of the part of data of the first data may be determined by the association information of the first data.

For example, the association information of the first data may be used to indicate the reception situation (ACK/NACK) of the first data. If the transmitting device is a network device, the association information of the first data is, for example, hybrid automatic repeat request acknowledgement (HARQ-ACK) information in uplink control information (UCI). If the transmitting device is a terminal equipment, the association information of the first data is, for example, an HARQ process in downlink control information (DCI) including an uplink grant (UL grant) and HARQ-ACK information in a new data indicator (NDI) or the DCI. For example, if an HARQ process number/ID in the UL grant is identical to an HARQ process number/ID of the first data and the NDI is reversed, it is deemed that the first data are received successfully.

In this embodiment, the association information of the first data is, for example, in the following forms:

TB-based, that is, the association information of the first data is used to indicate whether a TB is successfully received;

- CBG-based, that is, the association information of the first data is used to indicate whether each CBG of a TB is successfully received; for example, if a TB includes 2 CBGs, the association information of the first data includes 2 bits, each bit indicating whether a CBG is successfully received;
- CB-based, that is, the association information of the first data indicates whether each CB of a TB is successfully received;
- bandwidth unit-based, that is, the association information of the first data may be used to indicate whether data on different bandwidth units to which a TB corresponds are successfully received, here, different bandwidth units do not overlap in the frequency domain. In addition, the data on different bandwidth units may include an integer or non-integer number of CBs/CBGs of the first data. Taking that the bandwidth unit is an LBT sub-band as an example, the association information of the first data indicates whether the data on different LBT sub-bands to which a TB corresponds are successfully received, so as to respectively reflect channel conditions of different LBT sub-bands. The data here include an integer or non-integer number of CBs/CBGs (CBs or CBGs) of the first data, and the different LBT sub-bands here do not overlap in the frequency domain, such as LBT sub-band 1 and LBT sub-band 2 show in FIG. 4, and LBT sub-band 1-LBT sub-band 4 shown in FIG. 5.

In one implementation, after transmitting the above first data, the transmitting device monitors and receives the association information of the first data. After receiving the first data, the receiving device transmits the association information of the first data in the above-described manner. Therefore, if the transmitting device successfully receives the association information of the first data, it determines the reception situation of the first data or the reception situation of a part of data of the first data accordingly, and adjusts the CW associated with the bandwidth unit to which the part of the data corresponds. If the transmitting device does not successfully receive the association information of the first data within a period of time, the transmitting device may determine the reception situation of the first data or the reception situation of the part of data of the first data according to the reception situation of the association information of the first data. For example, as the association information of the first data is not received, it may deem that the association information of the first data indicates that the reception situation of the first data is unsuccessful (NACK), and then adjust the CW associated with the bandwidth unit to which the part of data correspond; or, as the association information of the first data is not received, it may deem that that the reception situation of the first data is unsuccessful (NACK), and then adjust the CW associated with the bandwidth unit to which the part of data corresponds.

In step 202 of this embodiment, after determining the reception situation of the first data or the part of data of the first data according to the association information of the first data or the reception situation of the association information of the first data, the transmitting device may adjust the CW associated with the bandwidth unit to which the first data or the part of data corresponds accordingly.

In one implementation of this embodiment, the transmitting device adjusts the CW associated with the bandwidth unit to which the first data correspond according to the reception situation of the first data.

In this implementation, the first data correspond to at least one bandwidth unit, and all of the frequency domain resources used for transmitting the first data are within the bandwidth range of the bandwidth unit to which the first data correspond, that is, the first data in this embodiment will not span the corresponding bandwidth unit. As shown in FIG. 6, since all of the frequency domain resources used for transmitting TB2 are located in LBT sub-band 2, and also located in LBT sub-band 3, TB2 may correspond to LBT sub-band 2 and/or LBT sub-band 3. Likewise, since all of the frequency domain resources used for transmitting TB1 are located in LBT sub-band 1, and also located in LBT sub-band 3, TB1 may correspond to LBT sub-band 1 and/or LBT sub-band 3. Likewise, since all of the frequency domain resources used for transmitting TB3 are located in LBT sub-band 3, TB3 may correspond to LBT sub-band 3. However, as a part of the frequency domain resources used for transmitting TB3 are located in LBT sub-band 1 and another part are located in LBT sub-band 2, TB3 does not correspond to LBT sub-band 1 and LBT sub-band 2.

In this implementation, the transmitting device may adjust the CW associated with the bandwidth unit to which the first data correspond according to the reception situation of the first data, or, in other words, the first data or the reception situation of the first data are/is used for adjustment of the CW associated with the bandwidth unit to which the first data correspond. On the contrary, if a part of the resources used for transmitting the first data are within a bandwidth range of a bandwidth unit and another part of the resources are outside the bandwidth unit, the transmitting device does not adjust the CW associated with the bandwidth unit according to the association information of the first data, or, in other words, the first data or the association information of the first data are/is not used for the adjustment of the CW associated with the bandwidth unit. Or, in other words, if the first data do not have a corresponding bandwidth unit, the association information of the first data is not used for the adjustment of the CW. For example, as shown in FIG. 6, if the carrier is only configured with LBT sub-band 1 and LBT sub-band 2, according to this implementation, TB3 does not correspond to any LBT sub-band, and TB3 is not used for adjustment of a CW associated with any LBT sub-band.

In this implementation, if the first data correspond to two or more LBT sub-bands and at least two of the two or more LBT sub-bands are associated with the same group of CWs, as to the adjustment of the CW, the first data or each TB or each CB or each CBG of the first data are/is only counted as one time of ACK/NACK. That is, for the same group of CWs, the first data or each TB or each CB or each CBG of the first data are/is only counted as one time of ACK/NACK, and will not be counted repeatedly.

Still taking FIG. 6 as an example, assuming that TB1 corresponds to LBT sub-band 1 and LBT sub-band 3, and LBT sub-band 1 and LBT sub-band 3 are associated with the same group of CW1, for the adjustment of CW1, TB1 is counted as one time of ACK/NACK, or each CB of TB1 is counted as one time of ACK/NACK, or each CBG of TB1 is counted as one time of ACK/NACK, and will not be counted repeatedly.

In another implementation of this embodiment, the transmitting device adjusts the CW associated with the bandwidth unit to which a part of data of the first data correspond according to the reception situation of the part of data.

In this implementation, the part of data are transmitted within the bandwidth range of the bandwidth unit to which the part of data corresponds.

In this implementation, the first data correspond to at least one bandwidth unit, and the part of the frequency domain resources used for transmitting the first data are located within the bandwidth range of the bandwidth unit to which the first data correspond, that is, the first data in this implementation may possibly span the bandwidth unit, such as TB3 shown in FIG. 6, which spans LBT sub-band 1 and LBT sub-band 2. Hence, in this implementation, there exists a situation in which a part of the frequency domain resources used for transmitting the first data are located within the bandwidth range of a bandwidth unit to which the first data correspond, and the other part of the frequency domain resources are located outside the bandwidth range of the bandwidth unit. Hence, in this implementation, the transmitting device may adjust a CW associated with a bandwidth unit to which a part of data in the first data carried by the frequency domain resources located within the bandwidth range correspond according to reception situation of this part of data. In this implementation, the above part of data may include an integer or non-integer number of CBs/CBGs.

In this implementation, the part of data may be counted as whether the reception of this time is successful (ACK/NACK). For example, if an integer number of CBs/CBGs or a non-integer number of CBs/CBGs of this part of data are all received successfully, the reception is counted as ACK; otherwise, the reception is counted as NACK; or, if one CB/CBG of this part of data is successfully received, the reception is counted as ACK; otherwise the reception is counted as NACK; or, a complete CB/CBG of the part of data may be counted as whether the reception of this time is successful, and an incomplete CB/CBG of the part of data is not counted; or, by introducing an adjustment factor, the integer CB/CBG or non-integer number of CBs/CBGs of the part of data are counted, which shall be described below by way of examples.

FIG. 7 is another schematic diagram of division of bandwidth units. As shown in FIG. 7, if the part of data includes an integer number of CBs/CBGs of the first data, for example, TB1 corresponds to LBT sub-band 1 and LBT sub-band 2; wherein CB0 and CB1 of TB1 are used to adjust CWs associated with LBT sub-band 2 and LBT sub-band 1, respectively. If the association information of the first data is CBG-based or CB-based, the association information of the first data may possibly indicate that CB0 is received successfully (ACK) and CB1 is received unsuccessfully (NACK), and the adjustment of CW associated with LBT sub-band 1 and CW associated with LBT sub-band 2 respectively according to the reception situation of the CB0 and the reception situation of the CB1 may make CW adjustment results match actual channel conditions.

If the part of data includes a non-integer number of CBs/CBGs (incomplete CBs/CBGs) of the first data.

In an example, the above incomplete CBs/CBGs may not be used for the adjustment of the CW associated with the bandwidth unit. As shown in FIG. 7, data reception situation of CB0 of TB2 is not used for adjustment of the CWs associated with LBT sub-band 1 and LBT sub-band 2. This is because that which of the LBT sub-bands causes a failure of reception of CB0 cannot be determined, and ignoring CB0 may make CW adjustment results match actual channel conditions.

In another example, in the part of data, factors (referred to as first factors, denoted by a1 and a2) may be introduced for counting ACK/NACK. For example, for an incomplete CB/CBG, if reception situation of the incomplete CB/CBG is ACK, it is counted as a1<1 times of ACK; and if the reception situation of the incomplete CB/CBG is NACK, it is counted as a2>1 times of NACK. Or, the reception situation of the incomplete CB/CBG is counted as (a1=a2) <1 times of ACK/NACK. In this example, values of a1 and a2 may be determined according to the number of bandwidth units where the CB/CBG is located and/or the number of CWs associated with the bandwidth unit where the CB/CBG is located, which is not limited in this embodiment. Thus, the transmitting device may adjust the contention window associated with the bandwidth unit to which the part of data corresponds according to the first factors. Here, the first factors may be used to count reception situation of the CB/CBG of this part of data.

In a further example, if two or more LBT sub-bands where the above incomplete CB/CBG is located are associated with the same group of CWs, the incomplete CB/CBG may be used for CW adjustment, and the incomplete CB/CBG may be counted as one time of ACK/NACK. As shown in FIG. 7, CB0 of TB2 spans two LBT sub-bands, i.e. LBT sub-band 1 and LBT sub-band 2, hence, if LBT sub-band 1 and LBT sub-band 2 are associated with the same group of CWs, CB0 of TB2 may be counted as one time of ACK/NACK, that is, it is not counted repeatedly for adjustment of the same CW.

In another implementation of this embodiment, the transmitting device may adjust the contention window associated with the bandwidth unit to which the part of data of the first data correspond according to the reception situation of the first data.

In this implementation, the part of data are transmitted within the bandwidth range of the bandwidth unit to which the part of data corresponds.

In this implementation, the first data correspond to at least one bandwidth unit, and a part of the frequency domain resources used for transmitting the first data are within a bandwidth range of a bandwidth unit, and another part are outside the bandwidth range of the bandwidth unit, hence, the transmitting device may adjust a CW associated with the bandwidth unit (i.e. the bandwidth unit to which the part of data correspond) according to the reception situation of the first data.

In this implementation, the transmitting device may also not use the first data to perform the CW adjustment of the bandwidth unit. This is because that as which of the bandwidth units causes a failure of the reception of the first data cannot be determined, the first data may be ignored, thereby making CW adjustment results match actual channel conditions.

In this implementation, similar to the previous implementation, factors (referred to as second factors, denoted by b1 and b2) may also be introduced for counting ACK/NACK, so as to adjust the CW associated with the bandwidth unit to which the part of data corresponds according to the reception situation of the first data.

For example, if the first data are successfully received, it is counted as b1<1 times of ACK. Here, if TB/CB/CBG of the first data are all successfully received, it is counted as ACK; otherwise, it is counted as NACK; if it is counted as NACK, it is counted as b2<1 times of NACK. Or, the reception situation of the first data is counted as (b1=b2)<1 times of ACK/NACK. Here, values of b1 and b2 may be determined according to the number of bandwidth units where the CB/CBG is located and/or the number of CWs associated with the bandwidth units where the CB/CBG is located. Thus, the transmitting device may adjust the contention window associated with the bandwidth unit to which the part of data corresponds according to the second factors. Here, the second factors may be used to count reception situation of the TB or CB or CBG of the first data.

In this implementation, similar to the previous implementation, if two or more bandwidth units where the incomplete CB/CBG is located are associated with the same group of CWs, the incomplete CB/CBG may be used for CW adjustment, and the incomplete CB/CBG is counted as one time of ACK/NACK. Or, complete/incomplete CBs/CBGs are not differentiate, and if all bandwidth units to which the first data correspond are associated with the same group of CWs, the CWs are adjusted according to the reception situation of the first data, so as to simplify the adjustment method.

In a further implementation of this embodiment, the number of the bandwidth units to which the first data correspond is two or more, and at least two of the two or more bandwidth units are associated with the same contention window, hence, in this implementation, the transmitting device may adjust contention windows associated with the at least two bandwidth units to which the first data correspond according to the reception situation of the first data.

In this embodiment, the first data are transmitted within bandwidth ranges of the two or more bandwidth units to which the first data correspond.

In this implementation, the correspondence between the first data and the bandwidth units includes the above two cases, i.e. a first case: that all of the frequency domain resources used for transmitting the first data are located in a bandwidth unit, and it is deemed that the first data correspond to the bandwidth unit; and a second case: that a part of the frequency domain resource used for transmitting the first data is located in a bandwidth unit, and it is deemed that the first data correspond to the bandwidth unit.

According to the first case, that is, that all of the frequency domain resources used for transmitting the first data are located in a bandwidth unit, and it is deemed that the first data correspond to the bandwidth unit. Taking FIG. 6 as an example, TB1 may correspond to LBT sub-band 1 and/or LBT sub-band 3, TB2 may correspond to LBT sub-band 2 and/or LBT sub-band 3, and TB3 may only correspond to LBT sub-band 3; and taking FIG. 7 as an example, neither TB1 nor TB2 may correspond to LBT sub-band 1 or LBT sub-band 2.

If at least two of the two or more bandwidth units to which the first data correspond are associated with the same CW, the transmitting device may adjust the CWs associated with the at least two bandwidth units according to the reception situation of the first data.

Taking TB1 in FIG. 6 as an example, assuming that TB1 corresponds to LBT sub-band 1 and LBT sub-band 3, and LBT sub-band 1 and LBT sub-band 3 are associated with the same CW, the transmitting device may adjust CWs associated with LBT sub-band 1 and LBT sub-band 3 according to the reception situation of TB1.

In the first case, the first data or a TB or a CB or a CBG of the first data are/is only counted as one time of ACK/NACK, that is, for the same group of CWs, reception situation of the first data or a TB or a CB or a CBG of the first data is not to be counted repeatedly.

According to the second case, that is, a part of the frequency domain resource used for transmitting the first data are located in a bandwidth unit, and it is deemed that the first data correspond to the bandwidth unit. Taking FIG. 6 as an example, TB1 may correspond to LBT sub-band 1 and/or LBT sub-band 3, TB2 may correspond to LBT sub-band 2 and/or LBT sub-band 3, and TB3 may correspond to LBT sub-band 1, LBT sub-band 2 and/or LBT sub-band 3; taking FIG. 7 as an example, both TB1 and TB2 may correspond to LBT sub-band 1 and LBT sub-band 2.

If at least two of the two or more bandwidth units corresponding to the first data are associated with the same CW, the transmitting device may adjust CWs associated with the at least two bandwidth units according to the reception situation of the first data. Moreover, parts of the first data to which the at least two bandwidth units correspond are not completely identical; for example, in FIG. 6, if TB3 corresponds to LBT sub-band 1 and LBT sub-band 3, a part of TB3 to which LBT sub-band 1 corresponds is not completely identical to a part of TB3 to which LBT sub-band 3 corresponds; and for another example, in FIG. 7, if TB1 and TB2 correspond to LBT sub-band 1 and LBT sub-band 2, a part of TB1 or TB2 to which LBT sub-band 1 corresponds and a part of TB1 or TB2 to which LBT sub-band 3 corresponds are not completely identical.

Taking TB1 shown in FIG. 7 as an example, assuming that TB1 corresponds to LBT sub-band 1 and LBT sub-band 2, and LBT sub-band 1 and LBT sub-band 2 are associated with the same CW, the transmitting device may adjust CWs associated with LBT sub-band 1 and LBT sub-band 2 according to reception situation of TB1.

In this example, the transmitting device may adjust the CWs associated with the at least two bandwidth units (LBT sub-band 1 and LBT sub-band 2) according to the reception situation of a part (such as CB0 or CB1) of data of the first data. At this moment of time, one CB/CBG may be counted as one time of ACK/NACK.

In this example, the transmitting device may also adjust the CWs associated with the at least two bandwidth units (LBT sub-band 1 and LBT sub-band 2) according to the reception situation of the entire first data (TB1). At this moment of time, a TB or a CB/CBG may be counted as one time of ACK/NACK.

Taking TB2 shown in FIG. 7 as an example, assuming that TB2 corresponds to LBT sub-band 1 and LBT sub-band 2, and LBT sub-band 1 and LBT sub-band 2 are associated with the same CW, the transmitting device may adjust CWs associated with LBT sub-band 1 and LBT sub-band 2 according to reception situation of TB2.

In this example, the transmitting device may adjust CWs associated with the at least two bandwidth units (LBT sub-band 1 and LBT sub-band 2) according to reception situation of a part of data of the first data (such as a part above the dotted line or a part below the dotted line). At this moment of time, a CB/CBG may be counted as one time of ACK/NACK.

In this example, the transmitting device may also adjust the CWs associated with the at least two bandwidth units (LBT sub-band 1 and LBT sub-band 2) according to the reception situation of the entire first data (TB2). At this moment of time, a TB or a CB/CBG may be counted as one time of ACK/NACK.

In the second case, the part of data of the first data may possibly include an integer number of CBs/CBG, for example, a part of TB1 (data above the dotted line or data below the dotted line) shown in FIG. 7 is CB1 or CB0, that is, this part of data contains an integer number of CBs; the part of data of the first data may also possibly include an integer number of CBs/CBGs and a non-integer number of CBs/CBGs, for example, a part of data of TB2 (data above the dotted line) shown in FIG. 7 is entire CB1 or a part of CB0; or, a part of data of the first data may only include a non-integer number of CBs/CBGs, for example, a part of data of TB2 (data below the dotted line) shown in FIG. 7 is a part of CB0.

With the method of this embodiment, in a case where data (referred to as first data) are transmitted on a carrier including two or more bandwidth units (such as a LBT sub-band/LBT channel), by adjusting the CW associated with a bandwidth unit to which the data correspond, a problem that the existing CW adjustment method is inapplicable to a scenario where a carrier corresponds to two or more bandwidth units may be solved.

Embodiment 2

The embodiment of this disclosure provides a data transmission method, applicable to a receiving device, such as the terminal equipment 102 or the network device 101 of the communication system shown in FIG. 1. This method is processing at a receiving device side corresponding to the method of Embodiment 1, and contents of this embodiment identical to those in Embodiment 1 shall not be described herein any further.

FIG. 8 is a schematic diagram of an implementation of the data transmission method of the embodiment of this disclosure. Referring to FIG. 8, the method includes:

step 801: a receiving device transmits first information to a transmitting device, the first information being used for indicating two or more bandwidth units of a carrier, the transmitting device transmitting first data on the carrier and adjusting a contention window (CW) associated with a bandwidth unit to which the first data correspond.

In this embodiment, the receiving device may also transmit second information to the transmitting device, the second information being used to indicate the bandwidth unit to which the first data correspond.

The method in FIG. 8 may be applicable to a network device. That is, a network device (which is taken as the receiving device in this embodiment) transmits the first information and second information to a terminal equipment (which is taken as the above transmitting device).

FIG. 9 is a schematic diagram of another implementation of the data transmission method of the embodiment of this disclosure. Referring to FIG. 9, the method includes:

step 901: a receiving device transmits association information of first data to a transmitting device, so that the transmitting device determines reception situation of the first data or reception of a part of data of the first data according to the association information of the first data, and adjusts a contention window associated with a bandwidth unit to which the part of data corresponds according to the reception situation of the first data or according to the reception situation of the part of data of the first data.

In this embodiment, the association information of the first data may be used to indicate whether data on different bandwidth units that do not overlap in the frequency domain to which a TB corresponds are successfully received.

The method in FIG. 9 may be applicable to a network device or a terminal equipment, that is, the network device (which is taken as the receiving device in this embodiment) may transmit the association information of the first data to the terminal equipment (which is taken as the above transmitting device), or, the terminal equipment (which is taken as the receiving device in this embodiment) may also transmit the association information of the first data to the network device (which is taken as the above transmitting device).

With the method of this embodiment, in a case where data (referred to as first data) are transmitted on a carrier including two or more bandwidth units (such as a LBT sub-band/LBT channel), by adjusting the CW associated with a bandwidth unit to which the data correspond, a problem that the existing CW adjustment method is inapplicable to a scenario where a carrier corresponds to two or more bandwidth units may be solved.

Embodiment 3

The embodiment of this disclosure provides a contention window adjustment apparatus, which may be configured in a transmitting device. As principles of the apparatus for solving problems are similar to that of the method in Embodiment 1, reference may be made to the implementation of the method in Embodiment 1 for implementation of this apparatus, with identical contents being not going to be described herein any further.

FIG. 10 is a schematic diagram of the contention window adjustment apparatus of the embodiment of this disclosure. Referring to FIG. 10, a contention window adjustment apparatus 1000 includes a transmitting unit 1001 and an adjusting unit 1002. The transmitting unit 1001 transmits first data on a carrier, the carrier including two or more bandwidth units, and the adjusting unit 1002 adjusts a contention window (CW) associated with a bandwidth unit to which the first data correspond.

In this embodiment, the number of the bandwidth unit to which the first data correspond is at least one.

In one implementation of this embodiment, as shown in FIG. 10, the adjusting unit 1002 may include a first adjusting unit 10021, which is configured to, according to a reception situation of a part of data of the first data, adjust a contention window associated with a bandwidth unit to which the part of data corresponds. Furthermore, the first adjusting unit 10021 may adjust the contention window associated with the bandwidth unit to which the part of data corresponds according to a first factor.

In this implementation, the first factor is used to perform counting on reception situation of CBGs or CBs of the part of data.

In this implementation, one complete CBG of the part of data is counted as one time of successful or unsuccessful reception, and one incomplete CBG of the part of data is not counted; or, one complete CB of the part of data is counted as one time of successful or unsuccessful reception, and one incomplete CB of the part of data is not counted; or, the part of data is counted as one time of successful or unsuccessful reception.

In this implementation, the part of data is transmitted within the bandwidth range of the bandwidth unit to which the part of data corresponds.

In another implementation of this embodiment, as shown in FIG. 10, the adjusting unit 1002 may further include a second adjusting unit 10022, which is configured to, according to a reception situation of the first data, adjust a contention window associated with a bandwidth unit to which a part of data of the first data corresponds.

In this implementation, the second adjusting unit 10022 may further adjust the contention window associated with the bandwidth unit to which the part of data corresponds according to a second factor.

In this implementation, the second factor is used to perform counting on reception situation of TBs or CBGs or CBs of the first data.

In this implementation, the part of data is transmitted within a bandwidth range of a bandwidth unit to which the part of data corresponds.

In a further implementation of this embodiment, the number of bandwidth units to which the first data correspond is two or more, at least two of the two or more bandwidth units are associated with identical contention windows, and in this implementation, as shown in FIG. 10, the adjusting unit 1002 may further include a third adjusting unit 10023, which is configured to, according to a reception situation of the first data, adjust contention windows associated with the at least two bandwidth units to which the first data correspond.

In this implementation, one TB or one CBG or one CB of the first data is counted as one time of successful or unsuccessful reception.

In this implementation, the first data are transmitted within bandwidth ranges of the two or more bandwidth units to which the first data correspond, and parts of the first data to which the at least two bandwidth units correspond are not completely identical.

In this embodiment, as shown in FIG. 10, the apparatus 1000 may further include:

a first determining unit 1003, which is configured to determine the bandwidth unit to which the first data correspond according to frequency-domain resources used for transmitting the first data.

In this embodiment, if all of the frequency-domain resources used for transmitting the first data are within a bandwidth range of one bandwidth unit, the bandwidth unit is the bandwidth unit to which the first data correspond; or, if at least parts of the frequency-domain resources used for transmitting the first data are within a bandwidth range of one bandwidth unit, the bandwidth unit is the bandwidth unit to which the first data correspond.

In this embodiment, the first determining unit 1003 may further determine the bandwidth unit to which the first data correspond according to at least one of the following:

an access priority of a channel used for transmitting the first data;

an interval of subcarriers used for transmitting the first data;

a position of a time-domain resource used for transmitting the first data;

a hybrid automatic repeat request (HARQ) process to which the first data correspond; and a time-frequency resource position of association information of the first data.

In this embodiment, as described above, the apparatus 1000 may be configured in a network device, or may be configured in a terminal equipment.

In this embodiment, the first data may include at least one transport block (TB), each TB including one or more code blocks (CBs), the one or more CBs being divided into one or more code block groups (CBGs).

In this embodiment, bandwidth sizes and/or frequency-domain initial positions of at least two of the two or more bandwidth units are different.

In this embodiment, the bandwidth unit is a Listen Before Talk (LBT) channel, or an LBT sub-band.

In this embodiment, the apparatus 1000 may be configured in a network device, and when it is configured in a network device, the above carrier is a downlink carrier. As shown in FIG. 10, the apparatus 1000 may further include:

a configuring unit 1004, which is configured to preconfigure the two or more bandwidth units contained in the downlink carrier.

In this embodiment, the apparatus 1000 may be configured in a terminal equipment, and when it is configured in a terminal equipment, the above carrier is an uplink carrier. As shown in FIG. 10, the apparatus 1000 may further include:

a first receiving unit 1005, which is configured to receive first information transmitted by the network device, the first information being used for indicating the two or more bandwidth units of the carrier.

In this embodiment, the apparatus 1000 may be configured in a terminal equipment, and when it is configured in a terminal equipment, the above carrier is an uplink carrier. As shown in FIG. 10, the apparatus 1000 may further include:

a second receiving unit 1006, which is configured to receive second information transmitted by the network device, the second information being used for indicating the bandwidth unit corresponding to the first data.

In this embodiment, an initial value of a random backoff counter used in a channel access procedure of the bandwidth unit is generated according to a CW associated with the bandwidth unit.

In this embodiment, the initial value of the random backoff counter used in a channel access procedure of a bandwidth unit in the bandwidth units is generated according to a CW associated with the bandwidth unit, and other bandwidth units associated with the same CW as the bandwidth unit quickly access to the channel under a condition that the channel access of the bandwidth unit is successful.

In this embodiment, as shown in FIG. 10, the apparatus 1000 may further include:

a third receiving unit 1007, which is configured to receive association information of the first data, and determine the reception situation of the first data or the reception situation of the part of data of the first data according to the association information of the first data.

Here, the association information of the first data are used to indicate that whether data on different bandwidth units to which one TB corresponds are successfully received, and the different bandwidth units do not overlap in the frequency domain.

Here, the data include an integer number or non-integer number of CBs or CBGs of the first data.

In this embodiment, as shown in FIG. 10, the apparatus 1000 may further include:

a second determining unit 1008, which is configured to determine a reception situation of the first data or a reception situation of a part of data of the first data according to a reception situation of the association information of the first data.

With the apparatus of this embodiment, a problem that the existing CW adjustment method is inapplicable to a scenario where a carrier corresponds to two or more bandwidth units may be solved.

Embodiment 4

The embodiment of this disclosure provides a data transmission apparatus, which may be configured in a receiving device. As principles of the apparatus for solving problems are similar to that of the method in Embodiment 2, reference may be made to the implementation of the method in Embodiment 2 for implementation of this apparatus, with identical contents being not going to be described herein any further.

Figure 11:
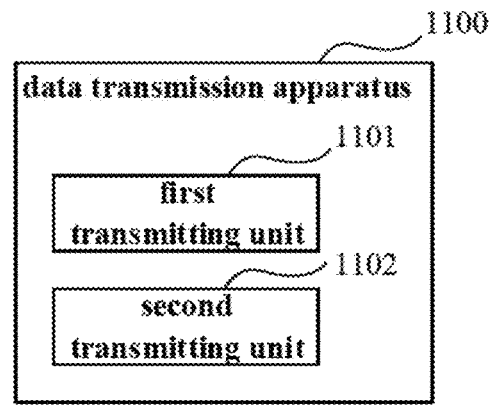
FIG. 11 is a schematic diagram of an implementation of the data transmission apparatus of Embodiment 4.

FIG. 11 is a schematic diagram of an implementation of the data transmission apparatus of the embodiment of this disclosure, which may be configured in a network device. Referring to FIG. 11, a data transmission apparatus 1100 includes: a first transmitting unit 1101, which is configured to transmit first information to a transmitting device, the first information being used for indicating two or more bandwidth units of a carrier, the transmitting device transmitting first data on the carrier and adjusting a contention window (CW) associated with a bandwidth unit to which the first data correspond.

In this embodiment, as shown FIG. 11, the apparatus 1100 may further include:

a second transmitting unit 1102, which is configured to transmit second information to the transmitting device, the first information being used for indicating a bandwidth unit to which the first data correspond.

Figure 12:
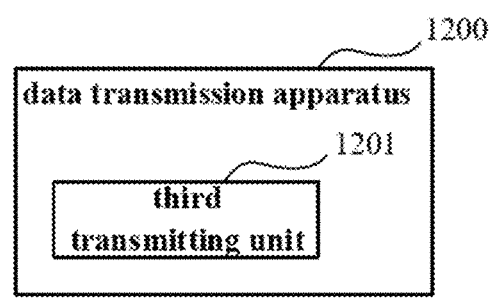
FIG. 12 is a schematic diagram of another implementation of the data transmission apparatus of Embodiment 4.

FIG. 12 is a schematic diagram of another implementation of the data transmission apparatus of the embodiment of this disclosure, which may be configured in a terminal equipment. Referring to FIG. 12, a data transmission apparatus 1200 includes: a third transmitting unit 1201, which is configured to transmit association information of the first data to the transmitting device, so that the transmitting device determines reception situation of the first data or reception situation of a part of data of the first data according to the association information of the first data, and adjusts a contention window associated with a bandwidth unit to which the part of data correspond according to the reception situation of the first data or according to the reception situation of the part of data of the first data.

In this embodiment, the association information of the first data may be used to indicate that whether data on different bandwidth units to which a TB corresponds are successfully received, and the different bandwidth units do not overlap in the frequency domain.

With the apparatus of this embodiment, a problem that the existing CW adjustment method is inapplicable to a scenario where a carrier corresponds to two or more bandwidth units may be solved.

Embodiment 5

The embodiment of this disclosure provides a network device, such as a gNB (a base station in NR), etc.; wherein, the network device includes the contention window adjustment apparatus 1000 described in Embodiment 3 or the data transmission apparatus 1100 described in Embodiment 4.

Figure 13:
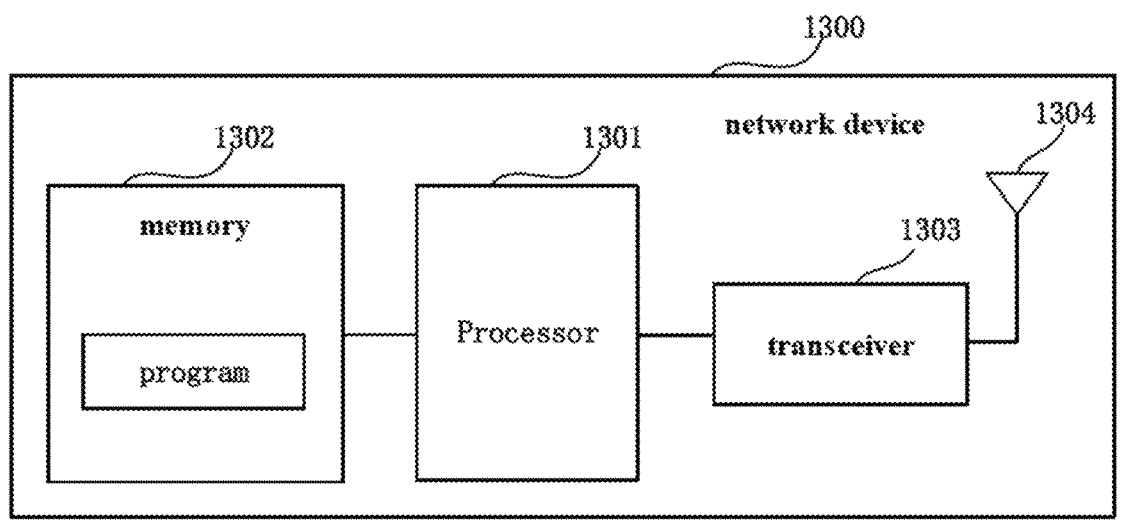
FIG. 13 is a schematic diagram of the network device of Embodiment 5.

FIG. 13 is a schematic diagram of the network device of the embodiment of this disclosure. As shown in FIG. 13, a network device 1300 may include a central processing unit (CPU) 1301 and a memory 1302, the memory 1302 being coupled to the central processing unit 1301. The memory 1302 may store various data, and furthermore, it may store a program for data processing, and execute the program under control of the central processing unit 1301, so as to receive various information transmitted by a terminal equipment, and transmit various information to the terminal equipment.

In one implementation, the functions of the apparatus 1000 described in Embodiment 3 or the apparatus 1100 described in Embodiment 4 may be integrated into the central processing unit 1301, and the central processing unit 1301 executes the functions of the apparatus 1000 described in Embodiment 3 or the apparatus 1100 described in Embodiment 4. The functions of the apparatus 1000 described in Embodiment 3 or the apparatus 1100 described in Embodiment 4 are incorporated herein, and shall not be described herein any further.

In another implementation, the apparatus 1000 described in Embodiment 3 or the apparatus 1100 described in Embodiment 4 and the central processing unit 1301 may be configured separately; for example, the apparatus 1000 described in Embodiment 3 or the apparatus 1100 described in Embodiment 4 may be configured as a chip connected to the central processing unit 1301, and the functions of the apparatus 1000 described in Embodiment 3 or the apparatus 1100 described in Embodiment 4 are executed under control of the central processing unit 1301.

Furthermore, as shown in FIG. 13, the network device 1300 may include a transceiver 1303, and an antenna 1304, etc. Functions of the above components are similar to those in the related art, and shall not be described herein any further. It should be noted that the network device 1300 does not necessarily include all the parts shown in FIG. 13. Furthermore, the network device 1300 may include parts not shown in FIG. 13, and the related art may be referred to.

With the network device of this embodiment, a problem that the existing CW adjustment method is inapplicable to a scenario where a carrier corresponds to two or more bandwidth units may be solved.

Embodiment 6

The embodiment of this disclosure provides a terminal equipment, including the apparatus 1000 described in Embodiment 3 or the apparatus 1200 described in Embodiment 4.

Figure 14:
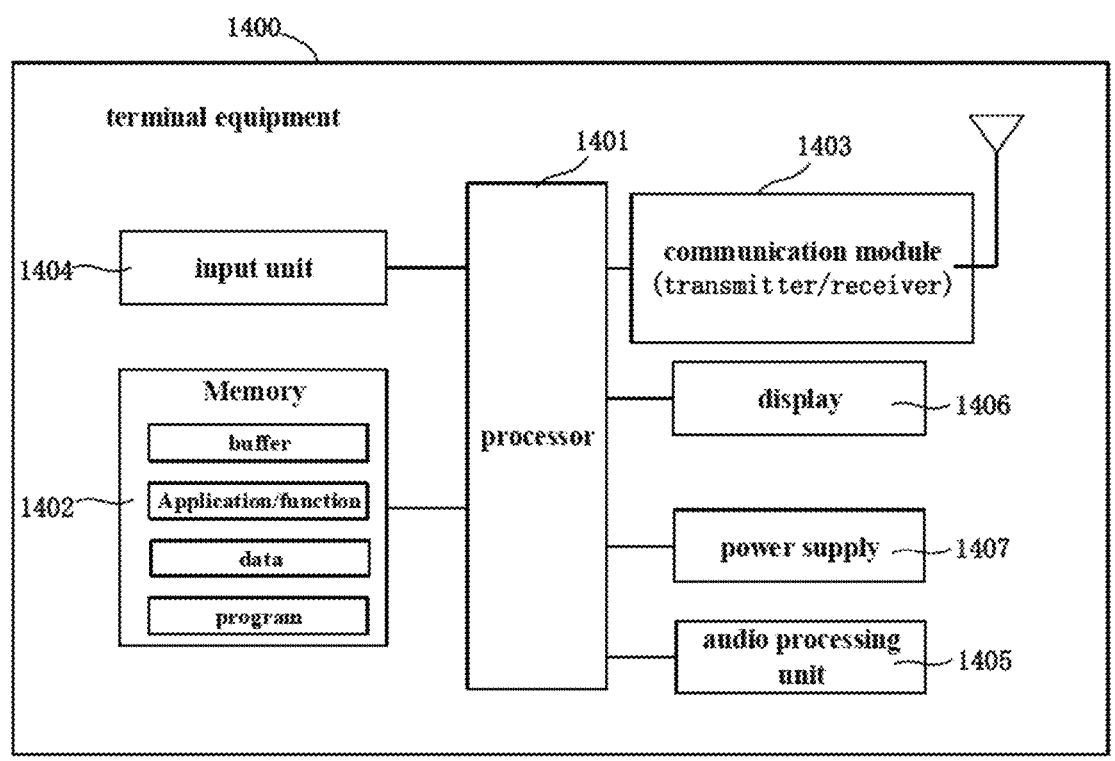
FIG. 14 is a schematic diagram of the terminal equipment of Embodiment 6.

FIG. 14 is a schematic diagram of the terminal equipment of the embodiment of this disclosure. As shown in FIG. 14, a terminal equipment 1400 may include a central processing unit (CPU) 1401 and a memory 1402, the memory 1402 being coupled to the central processing unit 1401. It should be noted that this figure is illustrative only, and other types of structures may also be used, so as to supplement or replace this structure and achieve a telecommunications function or other functions.

In one implementation, the functions of the apparatus 1000 described in Embodiment 3 or the apparatus 1200 described in Embodiment 4 may be integrated into the central processing unit 1401, and the central processing unit 1401 executes the functions of the apparatus 1000 described in Embodiment 3 or the apparatus 1200 described in Embodiment 4. The functions of the apparatus 1000 described in Embodiment 3 or the apparatus 1200 described in Embodiment 4 are incorporated herein, and shall not be described herein any further.

In another implementation, the apparatus 1000 described in Embodiment 3 or the apparatus 1200 described in Embodiment 4 and the central processing unit 1401 may be configured separately; for example, the apparatus 1000 described in Embodiment 3 or the apparatus 1200 described in Embodiment 4 may be configured as a chip connected to the central processing unit 1401, and the functions of the apparatus 1000 described in Embodiment 3 or the apparatus 1200 described in Embodiment 4 are executed under control of the central processing unit 1401.

As shown in FIG. 14, the terminal equipment 1400 may include a communication module 1403, an input unit 1404, an audio processing unit 1405, a display 1406, and a power supply 1407, etc. It should be noted that the terminal equipment 1400 does not necessarily include all the parts shown in FIG. 14. Furthermore, the terminal equipment 1400 may include parts not shown in FIG. 14, and the related art may be referred to.

As shown in FIG. 14, the central processing unit 1401 is sometimes referred to as a controller or an operational control, which may include a microprocessor or other processor devices and/or logic devices. The central processing unit 1401 receives input and controls operations of components of the terminal equipment 1400.

The memory 1402 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 1401 may execute programs stored in the memory 1402, so as to realize information storage or processing, etc. Functions of other parts are similar to those of the related art, which shall not be described herein any further. The parts of the terminal equipment 1400 may be realized by specific hardware, firmware, software, or any combination thereof, without departing from the scope of this disclosure.

With the terminal equipment of this embodiment, a problem that the existing CW adjustment method is inapplicable to a scenario where a carrier corresponds to two or more bandwidth units may be solved.

Embodiment 7

The embodiment of this disclosure provides a communication system, including a network device and a terminal equipment. The network device is, for example, the network device 1300 described in Embodiment 5, and the terminal equipment is, for example, the terminal equipment 1400 described in Embodiment 6.

In this embodiment, the network device may be, for example, a gNB in NR, and taken as a transmitting device, it may include the function of the apparatus 1000 described in Embodiment 3, and taken as a receiving device, it may include the function of the apparatus 1100 described in Embodiment 4. In addition, it also includes conventional compositions and functions of a network device, which are as described in Embodiment 5, and shall not be described herein any further.

In this embodiment, the terminal equipment is, for example, a UE served by a gNB, and taken as a transmitting device, it may include the function of the apparatus 1000 described in Embodiment 3, and taken as a receiving device, it may include the function of the apparatus 1200 described in Embodiment 4. In addition, it also includes conventional compositions and functions of a terminal equipment, which are as described in Embodiment 6, and shall not be described herein any further.

With the communication system of this embodiment, a problem that the existing CW adjustment method is inapplicable to a scenario where a carrier corresponds to two or more bandwidth units may be solved.

An embodiment of the present disclosure provides a computer readable program, which, when executed in a transmitting device, will cause a computer to carry out the method described in Embodiment 1 in the transmitting device.

An embodiment of this disclosure provides a computer storage medium, including a computer readable program, which will cause a computer to carry out the method described in Embodiment 1 in a transmitting device.

An embodiment of the present disclosure provides a computer readable program, which, when executed in a receiving device, will cause a computer to carry out the method described in Embodiment 2 in the receiving device.

An embodiment of this disclosure provides a computer storage medium, including a computer readable program, which will cause a computer to carry out the method described in Embodiment 2 in a receiving device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Following implementations are further disclosed below according the various implementations of the embodiments of this disclosure.

Supplement 1. A contention window adjustment apparatus, including:
 a transmitting unit configured to transmit first data on a carrier, the carrier including two or more bandwidth units; and
 an adjusting unit configured to adjust a contention window (CW) associated with a bandwidth unit to which the first data correspond.

Supplement 2. The apparatus according to supplement 1, wherein the number of the bandwidth units to which the first data correspond is at least one.

Supplement 3. The apparatus according to supplement 2, wherein the adjusting unit includes:
 a first adjusting unit configured to, according to a reception situation of a part of data of the first data, adjust a contention window associated with a bandwidth unit to which the part of data corresponds.

Supplement 4. The apparatus according to supplement 3, wherein, the first adjusting unit further adjusts the contention window associated with the bandwidth unit to which the part of data corresponds according to a first factor.

Supplement 5. The apparatus according to supplement 4, wherein,
the first factor is used to perform counting on reception situation of CBGs or CBs of the part of data.

Supplement 6. The apparatus according to any one of supplements 3-5, wherein,
one complete CBG of the part of data is counted as one time of successful or unsuccessful reception, and one incomplete CBG of the part of data is not counted; or
one complete CB of the part of data is counted as one time of successful or unsuccessful reception, and one incomplete CB of the part of data is not counted.

Supplement 7. The apparatus according to any one of supplements 3-5, wherein, the part of data is counted as one time of successful or unsuccessful reception.

Supplement 8. The apparatus according to supplement 2, wherein the adjusting unit includes:
a second adjusting unit configured to, according to a reception situation of the first data, adjust a contention window associated with a bandwidth unit to which a part of data of the first data corresponds.

Supplement 9. The apparatus according to supplement 8, wherein,
the second adjusting unit further adjusts the contention window associated with the bandwidth unit to which the part of data corresponds according to a second factor.

Supplement 10. The apparatus according to supplement 9, wherein,
the second factor is used to perform counting on reception situation of TBs or CBGs or CBs of the first data.

Supplement 11. The apparatus according to any one of supplements 3-10, wherein the part of data is transmitted within a bandwidth range of a bandwidth unit to which the part of data corresponds.

Supplement 12. The apparatus according to any one of supplements 2-11, wherein the number of bandwidth units to which the first data correspond is two or more, at least two of the two or more bandwidth units being associated with identical contention windows, and the adjusting unit further includes:
a third adjusting unit configured to, according to a reception situation of the first data, adjust contention windows associated with the at least two bandwidth units to which the first data correspond.

Supplement 13. The apparatus according to supplement 12, wherein,
one TB or one CBG or one CB of the first data is counted as one time of successful or unsuccessful reception.

Supplement 14. The apparatus according to supplement 12 or 13, wherein the first data are transmitted within bandwidth ranges of the two or more bandwidth units to which the first data correspond, and parts of the first data to which the at least two bandwidth units correspond are not completely identical.

Supplement 15. The apparatus according to any one of supplement 1-14, wherein the apparatus further includes:
a first determining unit configured to determine the bandwidth unit to which the first data correspond according to frequency-domain resources used for transmitting the first data.

Supplement 16. The apparatus according to supplement 15, wherein,
if all of the frequency-domain resources used for transmitting the first data are within a bandwidth range of one bandwidth unit, the bandwidth unit is the bandwidth unit to which the first data correspond; or
if at least parts of the frequency-domain resources used for transmitting the first data are within a bandwidth range of one bandwidth unit, the bandwidth unit is the bandwidth unit to which the first data correspond.

Supplement 17. The apparatus according to supplement 16, wherein the first determining unit determines the bandwidth unit to which the first data correspond according to at least one of the following:
an access priority of a channel used for transmitting the first data;
an interval of subcarriers used for transmitting the first data;
a position of a time-domain resource used for transmitting the first data;
a hybrid automatic repeat request (HARQ) process to which the first data correspond; and
a time-frequency resource position of association information of the first data.

Supplement 18. The apparatus according to any one of supplements 1-17, wherein the apparatus is configured in a network device or a terminal equipment.

Supplement 19. The apparatus according to any one of supplements 1-18, wherein the first data include at least one transport block (TB), each transport block including one or more code blocks (CBs), the one or more code blocks being divided into one or more code block groups (CBGs)

Supplement 20. The apparatus according to any one of supplements 1-18, wherein bandwidth sizes and/or frequency-domain initial positions of at least two of the two or more bandwidth units are different.

Supplement 21. The apparatus according to any one of supplements 1-20, wherein the bandwidth unit is a Listen Before Talk channel (LBT channel), or a Listen Before Talk sub-band (LBT sub-band).

Supplement 22. The apparatus according to any one of supplements 1-21, wherein the apparatus is configured in a network device, the carrier is a downlink carrier, and the apparatus further includes:
a configuring unit configured to preconfigure the two or more bandwidth units contained in the downlink carrier.

Supplement 23. The apparatus according to any one of supplements 1-21, wherein the apparatus is configured in a terminal equipment, and the apparatus further includes:
a first receiving unit configured to receive first information transmitted by the network device, the first information being used for indicating the two or more bandwidth units of the carrier.

Supplement 24. The apparatus according to any one of supplements 1-21, wherein the apparatus is configured in a terminal equipment, and the apparatus further includes:
a second receiving unit configured to receive second information transmitted by the network device, the second information being used for indicating the bandwidth unit to which the first data correspond.

Supplement 25. The apparatus according to any one of supplements 1-24, wherein the association refers to that an initial value of a random backoff counter used in a channel access procedure of the bandwidth unit is generated according to the CW associated with the bandwidth unit.

Supplement 26. The apparatus according to any one of supplements 1-24, wherein an initial value of a random backoff counter used in a channel access procedure of a bandwidth unit of the bandwidth units is generated according to a CW associated with the bandwidth unit, and other bandwidth units associated with the same CW as the bandwidth unit quickly access to the channel under a condition that the channel access of the bandwidth unit is successful.

Supplement 27. The apparatus according to any one of supplements 3-10, wherein the apparatus further includes:
a third receiving unit configured to receive association information of the first data, and determine the reception situation of the first data or the reception situation of a part of data of the first data according to the association information of the first data.

Supplement 28. The apparatus according to supplement 27, wherein the association information of the first data is used to indicate that whether data on different bandwidth units to which a TB corresponds are successfully received, and the different bandwidth units do not overlap in the frequency domain.

Supplement 29. The apparatus according to supplement 27 or 28, wherein the data include an integer number or non-integer number of CBs or CBGs of the first data.

Supplement 30. The apparatus according to any one of supplements 3-10, wherein the apparatus further includes:
a second determining unit configured to determine a reception situation of the first data or a reception situation of a part of data of the first data according to a reception situation of the association information of the first data.

Supplement 31. A data transmission apparatus, including:
a first transmitting unit configured to transmit first information to a transmitting device, the first information being used for indicating two or more bandwidth units of a carrier, the transmitting device transmitting first data on the carrier and adjusting a contention window (CW) associated with a bandwidth unit to which the first data correspond.

Supplement 32. The apparatus according to supplement 31, wherein the apparatus further includes:
a second transmitting unit configured to transmit second information to the transmitting device, the first information being used for indicating a bandwidth unit to which the first data correspond.

Supplement 33. A data transmission apparatus, including:
a third transmitting unit configured to transmit association information of first data to a transmitting device, so that the transmitting device determines reception situation of the first data or reception situation of a part of data of the first data according to association information of the first data, and adjusts a contention window associated with a bandwidth unit to which the part of data corresponds according to the reception situation of the first data or according to the reception situation of the part of data of the first data.

Supplement 34. The apparatus according to supplement 33, wherein the association information of the first data is used to indicate that whether data on different bandwidth units to which a TB corresponds are successfully received, and the different bandwidth units do not overlap in the frequency domain.

What is claimed is:

1. A contention window adjustment apparatus, comprising:
a transmitter configured to transmit first data on a carrier, the carrier comprising two or more bandwidth units indicated by a network device via first information; and
processor circuitry configured to, in a case where a contention window (CW) is associated with more than one bandwidth unit in the two or more bandwidth units and the more than one bandwidth unit include a bandwidth unit within which at least parts of frequency-domain resources used for transmitting the first data are included, adjust the contention window (CW) according to hybrid automatic repeat request acknowledgement (HARQ-ACK) information of the first data.

2. The apparatus according to claim 1, wherein the number of the bandwidth unit within which at least parts of frequency-domain resources used for transmitting the first data is at least one.

3. A contention window adjustment apparatus, comprising:
a transmitter configured to transmit first data on a carrier, the carrier comprising two or more bandwidth units; and
processor circuitry configured to adjust a contention window (CW) associated with a bandwidth unit within which at least parts of frequency-domain resources used for transmitting the first data are included according to hybrid automatic repeat request acknowledgement (HARQ-ACK) information of the first data,
wherein the number of the bandwidth unit within which at least parts of frequency-domain resources used for transmitting the first data is at least one, and
wherein the processor circuitry is configured to:
according to a reception situation of a part of data of the first data, adjust a contention window associated with a bandwidth unit within which at least parts of frequency-domain resources used for transmitting the part of data are included.

4. The apparatus according to claim 3, wherein,
the processor circuitry is further configured to adjust the contention window associated with the bandwidth unit within which at least parts of frequency-domain resources used for transmitting the part of data are included according to a first factor.

5. The apparatus according to claim 4, wherein,
the first factor is used to perform counting on reception situation of code block groups (CBGs) or code blocks (CBs) of the part of data.

6. The apparatus according to claim 3, wherein,
one complete code block group (CBG) of the part of data is counted as one time of successful or unsuccessful reception, and one incomplete CBG of the part of data is not counted; or
one complete code block (CB) of the part of data is counted as one time of successful or unsuccessful reception, and one incomplete CB of the part of data is not counted.

7. The apparatus according to claim 3, wherein,
the part of data is counted as one time of successful or unsuccessful reception.

8. A contention window adjustment apparatus, comprising:
a transmitter configured to transmit first data on a carrier, the carrier comprising two or more bandwidth units; and
processor circuitry configured to adjust a contention window (CW) associated with a bandwidth unit within which at least parts of frequency-domain resources used for transmitting the first data are included according to hybrid automatic repeat request acknowledgement (HARQ-ACK) information of the first data,
wherein the number of the bandwidth unit within which at least parts of frequency-domain resources used for transmitting the first data is at least one, and wherein the processor circuitry is configured to:
according to a reception situation of the first data, adjust a contention window associated with a bandwidth unit within which at least parts of frequency-domain resources used for transmitting a part of data of the first data are included.

9. The apparatus according to claim 8, wherein, the processor circuitry is further configured to adjust the contention window associated with the bandwidth unit to which the part of data corresponds according to a second factor.

10. The apparatus according to claim 9, wherein, the second factor is used to perform counting on reception situation of transport blocks (TBs) code block groups (CBGs) or code blocks (CBs) of the first data.

11. The apparatus according to claim 3, wherein the part of data is transmitted within a bandwidth range of a bandwidth unit within which at least parts of frequency-domain resources used for transmitting the part of data are included.

12. The apparatus according to claim 2, wherein the number of bandwidth units within which at least parts of frequency-domain resources used for transmitting the first data are included is two or more, at least two of the two or more bandwidth units being associated with identical contention windows, and
the processor circuitry is configured to, according to a reception situation of the first data, adjust contention windows associated with the at least two bandwidth units within which at least parts of frequency-domain resources used for transmitting the first data are included.

13. The apparatus according to claim 12, wherein, one of transport block (TB) or one code block group (CBG) or one code block (CB) of the first data is counted as one time of successful or unsuccessful reception.

14. The apparatus according to claim 12, wherein parts of data of the first data transmitted respectively in the at least two bandwidth units are not completely identical.

15. The apparatus according to claim 1, wherein the processor circuitry is configured to:
determine the bandwidth unit within which at least parts of frequency-domain resources used for transmitting the first data are included according to frequency-domain resources used for transmitting the first data.

16. The apparatus according to claim 15, wherein,
if all of the frequency-domain resources used for transmitting the first data are within a bandwidth range of one bandwidth unit, the one bandwidth unit is the bandwidth unit within which at least parts of frequency-domain resources used for transmitting the first data are included; or
if at least parts of the frequency-domain resources used for transmitting the first data are within a bandwidth range of one bandwidth unit, the one bandwidth unit is the bandwidth unit within which at least parts of frequency-domain resources used for transmitting the first data are included.

17. The apparatus according to claim 15, wherein the processor circuitry is configured to determine the bandwidth unit within which at least parts of frequency-domain resources used for transmitting the first data are included according to at least one of the following:
an access priority of a channel used for transmitting the first data;
an interval of subcarriers used for transmitting the first data;
a position of a time-domain resource used for transmitting the first data;
a hybrid automatic repeat request (HARQ) process to which the first data correspond; and
a time-frequency resource position of association information of the first data.

18. The apparatus according to claim 1, wherein bandwidth sizes and/or frequency-domain initial positions of at least two of the two or more bandwidth units are different.

19. The apparatus according to claim 3, wherein the processor circuitry is configured to:
receive association information of the first data, and determine the reception situation of the first data or the reception situation of the part of data of the first data according to the association information of the first data.

20. The apparatus according to claim 19, wherein the association information of the first data is used to indicate that whether data on different bandwidth units to which one transport block (TB) corresponds are successfully received, and, the different bandwidth units do not overlap in the frequency domain.

* * * * *